(12) United States Patent
Listl et al.

(10) Patent No.: US 6,285,031 B1
(45) Date of Patent: Sep. 4, 2001

(54) RADIATION DOSIMETRY METHOD AND ASSOCIATED APPARATUS

(75) Inventors: Carl A. Listl, New Hyde Park, NY (US); David F. Lewis, Monroe, CT (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/216,349

(22) Filed: Dec. 18, 1998

(51) Int. Cl.$^7$ ....................................... G01T 1/02
(52) U.S. Cl. ........................................... 250/474.1
(58) Field of Search .......................... 250/474.1

(56) References Cited

U.S. PATENT DOCUMENTS 5,637,876 * 6/1997 Donahue et al. ................. 250/474.1

OTHER PUBLICATIONS

K. C. Humpherys and A. D. Kantz, "Radiachromic: A Radiation Monitoring System." *Radiat. Phys. Chem.*, vol. 9, No. 46, Pergamon Press, Great Britain, pp. 737–747, Apr. 1977.*

* cited by examiner

Primary Examiner—Constantine Hannaher
(74) Attorney, Agent, or Firm—William J. Davis; Jules E. Goldberg

(57) ABSTRACT

A method and associated apparatus for monitoring exposure to radiation, with compensation for temperature variation of a sensor and variations in the amount of radiation sensitive material in a dosimeter used in the method. The method utilizes a radiation dosimeter having a layer of radiation sensitive material on a substrate, the radiation sensitive material having an optical absorbance which varies in accordance with degree of radiation exposure and wavelength and which also varies in dependence on temperature. The radiation sensitive layer includes a substantially radiation impervious substance. The method comprises exposing the layer of radiation sensitive material to a dose of radiation, optically measuring a spectral absorbance of the exposed layer of radiation sensitive material within a range of wavelengths, examining the measured spectral absorbance of the exposed layer of radiation sensitive material to determine an absorbance coordinate and a wavelength coordinate of a predetermined point on a spectral absorbance curve of the exposed layer of radiation sensitive material, and determining a radiation dose value associated with the absorbance coordinate and the wavelength coordinate. Generally, the radiation dose value is determined by consulting a table of absorbance and wavelength coordinates with associated dose values which have been previously measured for a batch of the radiation sensitive material, the batch having a uniform absorbance coefficient and a common concentration of the radiation sensitive material. The method can automatically compensate for variations in the amount of radiation sensitive material by adjusting the absorbance value of the radiation sensitive material by a measured value of absorbance in the radiation impervious substance.

27 Claims, 2 Drawing Sheets

RADIATION DOSIMETRY METHOD AND ASSOCIATED APPARATUS

BACKGROUND OF THE INVENTION

This invention relates to a radiation dosimetry method and associated devices for carrying out the method. More particularly, this invention relates to such a method and associated apparatus which compensates for variations in temperature and amounts of a radiation sensitive material in a dosimeter.

In facilities where radioactive materials are used, for example, in hospitals where cancer patients receive radiation treatments or in blood banks where blood products are irradiated, various methods are used to quantitatively determine the radiation dose. The methods practiced include the use of thermoluminescent dosimeters (TLD's), ionization-type radiation detectors, photographic film, and radiochromic materials. TLD's are inconvenient because they require a complicated and time-consuming read-out process. Ionization-type radiation detectors are awkward and unwieldy and require a complicated setup. Photographic film requires a time-consuming chemical processing procedure before read-out. Radiochromic materials are inconvenient in current practice because the calculation of the dose requires a complex sequence of steps, subject to operator error.

U.S. Pat. No. 5,637,876 describes a radiation dosimeter, exemplarily for use in determining a level of radiation to which a patient is subjected during radiation treatment, which comprises a substrate provided with a layer of radiation sensitive material. The radiation sensitive material has an optical density which varies systematically in accordance with the degree of radiation exposure. The dosimeter may take the form of a card or a flexible substrate which is positionable on the patient or other irradiation subject and which is also positionable in, or slidable through a slot in, a dose reader which includes a reflection or transmission densitometer.

The radiation sensitive material of a radiation dosimeter may be dispersions of crystalline pentacosadiynoic acid (PCDA). Subjecting monomeric PCDA crystals to ionizing radiation results in progressive polymerization, the degree of polymerization increasing with radiation dose. The amount of polymerization (and hence, the radiation dose) can be determined by measuring either the optical density or the spectral absorption of the exposed dosimeter. However, it has been found that these parameters also vary with both the temperature of the device when measured as well as the thickness of PCDA dispersion. Maximum accuracy of dose measurement must account for the temperature and thickness effects.

Temperature corrections are commonly applied to the output of sensors of whatever type; the method is straight forward. First the response or reaction of a sensor to a specific action is calibrated at a given (reference) temperature. Second, the change in response with respect to temperature is measured over a range of temperature and input action; this step characterizes the temperature dependence of the sensor. Then, during actual use of the sensor, assuming it is not maintained at the reference temperature, both the sensor's reaction (to the action its purpose it is to sense) as well as the sensor's temperature are measured. The measured reaction is corrected for temperature effect by using the data from step two. This yields a temperature corrected reaction, i.e., a calculated value of the reaction the sensor would be expected to have for the action at hand had the sensor been at its reference temperature. Finally, the amount of action the sensor is being subjected to is calculated from the corrected reaction by using the calibration data of step one. While giving good results the method suffers from the requirement to measure the sensor's temperature.

OBJECTS OF THE INVENTION

An object of the present invention is to provide a method for determining a radiation dose to which a dosimeter has been subjected, with compensation for temperature effects and/or thickness variations.

Another object of the present invention is to provide such a method wherein the temperature of the dosimeter need not be measured directly as a prerequisite to determining the radiation dose.

A further object of the present invention is to provide such a method which is efficient and easy to implement.

Yet another object of the present invention is to provide an associated apparatus for determining a radiation dose to which a dosimeter has been subjected, with compensation for temperature effects and/or thickness variations.

These and other objects of the present invention will be apparent from the drawings and descriptions herein.

BRIEF DESCRIPTION

Measurements of radiation exposed PCDA based dosimeter material show that its optical absorbance, while strongly a function of radiation, is not constant with temperature. Rather, it exhibits two peaks: a minor one at approximately 600 nanometers, a col at approximately 620 nm and a major peak at approximately 650 nm. In general, optical absorption increases with radiation dose. However, it has been observed that these spectra are temperature dependent, thus requiring temperature correction before dose can be determined from absorbance. Closer examination of sets of spectra for a PCDA dosimeter show that the spectra move in a regular manner in absorbance-wavelength space as temperature is varied. As opposed to characterizing the motion of the full spectrum (in absorbance—wavelength space as a function of temperature), characterizing the motion of some identifiable feature of the spectrum is much simpler. Readily discernible features are the two peaks and the col.

This invention is based on or incorporates the recognition that a predetermined point (e.g., peak or col) on a curve or surface in absorbance-wavelength space is associated with a unique temperature and a unique radiation dose. Determination of the absorbance and wavelength coordinates of the predetermined point thus enables one to determine the radiation dose to which the detector has been subjected.

A method, in accordance with the present invention, for monitoring exposure to radiation, with compensation for temperature variation of a sensor, utilizes a radiation dosimeter including a layer of radiation sensitive material on a substrate, the radiation sensitive material having an optical absorbance which varies in accordance with degree of radiation exposure and wavelength and which also varies in dependence on temperature. The method comprises, in accordance with a general embodiment of the present invention, exposing the layer of radiation sensitive material to a dose of radiation, optically measuring a spectral absorbance of the exposed layer of radiation sensitive material within a range of wavelengths, examining the measured spectral absorbance of the exposed layer of radiation sensitive material to determine an absorbance coordinate and a wavelength coordinate of a predetermined point on a spectral absorbance curve of the exposed layer of radiation sensitive material, and determining a radiation dose value associated with the absorbance coordinate and the wavelength coordinate. Generally, the radiation dose value is determined by consulting a table of absorbance and wavelength coordinates with associated dose values which have been previously measured for a batch of the radiation sensitive material, the batch having a uniform absorbance coefficient and a common concentration of the radiation sensitive material (e.g., PCDA).

In accordance with a particular feature of the present invention, the measuring of the spectral absorbance of the exposed layer of radiation sensitive material is accomplished by operating a spectrophotometer. The spectrophotometer detects the absorbance of the exposed radiation sensitive material at each wavelength within a predetermined range. Specific absorbance and wavelength values may be fed to a programmed circuit or other device, which automatically analyzes or examines the spectral data to determine the spectral absorbance curve and, more particularly, to determine the absorbance and wavelength coordinates of a predetermined point on the spectral absorbance curve. The predetermined point is preferably a local minimum or maximum point and more preferably a highest peak of the spectral absorbance curve.

Where the predetermined point for determination of the radiation dose is a local maximum, the examining or analyzing of the measured spectral absorbance of the exposed layer of radiation sensitive material includes automatically comparing absorbance values corresponding to successive wavelengths in a monotonic sequence with one another to detect a rising and a subsequent falling in the absorbance values, defining the local maximum. In other words, as the wavelength increases or decreases, the associated absorbance values are monitored to detect the point at which the absorbance stairs to fall after a continuous rise. That point is a local maximum in the spectral absorbance curve.

In a preferred embodiment of the invention, the layer of radiation sensitive material also includes a substantially radiation impervious substance, that is, a chemical component which is not significantly altered in response to the incident radiation (ultraviolet, X-ray, gamma, etc.) which causes the changes in the radiation sensitive component, e.g. PCDA. However, the radiation impervious substance does absorb electromagnetic energy or photon packets at a wavelength outside of the range in which the absorbance of the exposed radiation sensitive material is monitored. The method then further comprises operating the spectrophotometer to measure an absorbance of the radiation impervious substance in the exposed layer of radiation sensitive material, and adjusting the absorbance value of the predetermined point in accordance with the measured value of the absorbance of the radiation impervious substance, thereby compensating for variation in a thickness of the layer of radiation sensitive material. Preferably, adjusting the absorbance value of the predetermined point includes multiplying the absorbance value of the predetermined point by the ratio of a reference absorbance value to the measured value of the absorbance of the radiation impervious substance. Thereafter, the radiation dose value is determined by consulting a table of (thickness corrected) absorbance and wavelength coordinates with associated dose values which have been previously measured for a batch of radiation sensitive material, the batch having a uniform absorbance coefficient and a common concentration of the radiation sensitive material (e.g., PCDA).

In accordance with the thickness compensation feature of the present invention, a method for monitoring exposure to radiation utilizes a radiation dosimeter including a layer of radiation sensitive material and a substantially radiation impervious substance on a substrate, the radiation sensitive material having an optical absorbance which varies in dependence on thickness of the layer of radiation sensitive material. The method comprises exposing the layer of radiation sensitive material to a dose of radiation, optically measuring an absorbance of the exposed layer of radiation sensitive material, measuring an absorbance of the radiation impervious substance in the exposed layer of radiation sensitive material, adjusting the optically measured absorbance of the exposed layer of radiation sensitive material in accordance with the measured value of the absorbance of the radiation impervious substance to compensate for variation in a thickness of the layer of radiation sensitive material, and determining a radiation dose value from the thickness corrected absorbance coordinate and wavelength coordinate of the predetermined point.

The present invention is also directed to an apparatus for determining the degree of exposure to radiation of an exposed radiation dosimeter including a layer of radiation sensitive material on a substrate, the radiation sensitive material having an optical absorbance which varies in accordance with degree of radiation exposure and wavelength and which also varies in dependence on temperature. The apparatus comprises an optical sensor such as a spectrophotometer for optically measuring a spectral absorbance of the exposed layer of radiation sensitive material within a range of wavelengths, a spectral analysis component operatively connected to the optical sensor for examining the measured spectral absorbance of the exposed layer of radiation sensitive material to determine an absorbance coordinate and a wavelength coordinate of a predetermined point on a spectral absorbance curve of the exposed layer of radiation sensitive material, and a correlating element operatively connected to spectral analysis means for determining a radiation dose value associated with the absorbance coordinate and the wavelength coordinate.

Where the predetermined point is a local maximum of the spectral absorbance curve, the spectral analysis component includes a comparator for automatically comparing absorbance values corresponding to successive wavelengths in a monotonic sequence with one another to detect a rising and a subsequent falling in the absorbance values, defining the local maximum.

Where the layer of radiation sensitive material includes a substantially radiation impervious substance which absorbs electromagnetic energy outside of the optical absorbance spectrum of the exposed radiation sensitive material, the apparatus further comprises a sensor or detector for measuring an absorbance of the radiation impervious substance in the exposed layer of radiation sensitive material and a thickness compensating circuit operatively connected to the spectral analysis component for adjusting the optically measured absorbance coordinate of the radiation sensitive component in accordance with the measured value of the absorbance of the radiation impervious substance, to compensate for variation in a thickness of the layer of radiation sensitive material, the correlating element is operatively connected to the thickness compensation circuit for determining a radiation does value associated with the thickness corrected absorbance coordinate and the wavelength coordinate. Preferably, the thickness compensating circuit includes means for multiplying the absorbance coordinate value by the ratio of a reference absorbance value to the measured value of the absorbance of the radiation impervious substance.

A method of obviating the sensor temperature measurement in accordance with the present invention holds for all given dosimeters having the same absorbance coefficient, PCDA concentration and dispersion thickness. Dosimeters made from the same batch of PCDA dispersion can be expected to have the same absorbance coefficient and PCDA concentration.

DESCRIPTION OF THE PREFERRED EMBODIMENTS

Figure 1:
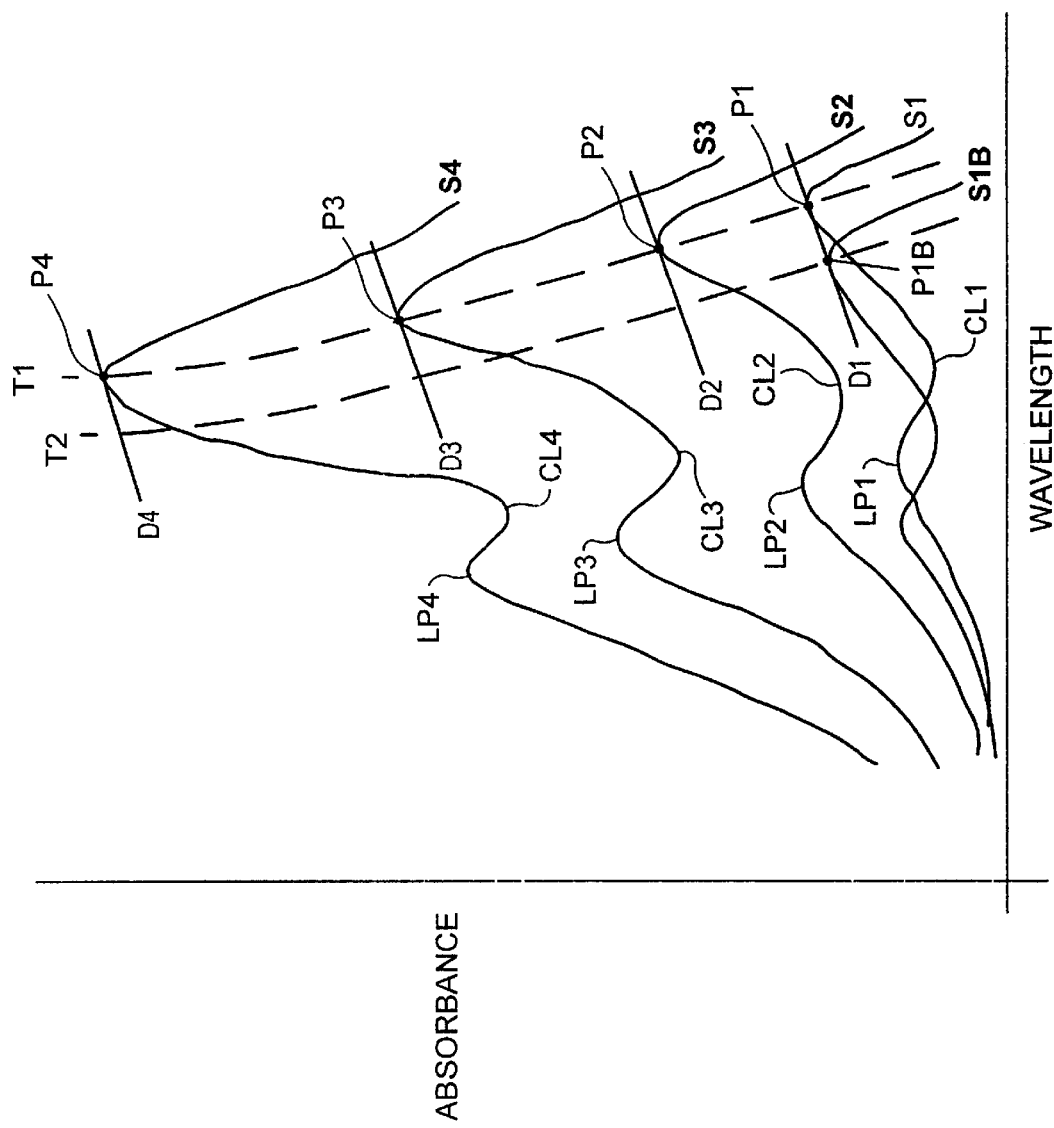
FIG. 1 is a graph of spectral absorbance curves for exposed dosimeter material for a plurality of different radiation doses, showing isodose contours D1–D4 and isothermal contours T1, T2.

In FIG. 1, curves S1 through S4 are a set of PCDA (pentacosadyinoic acid) absorbance spectra for an exposed dosimeter for progressively greater radiation doses, all measured at the same temperature T1. An isothermal contour T1 is drawn through the major peaks P1, P2, etc. Another curve S1B is a spectrum for the same radiation dose which resulted in spectrum S1 except that absorbance curve or spectrum S1 was determined at a dosimeter temperature T1 and while absorbance curve or spectrum S1B was measured at a different dosimeter temperature T2. Accordingly, an isodose contour D1 passes through major peaks P1 and P1B of curves or spectra S1 and S1B. Without hopelessly obscuring the figure with additional spectra, it is possible to measure spectra and construct two families of contours for the coordinates of the major absorbance peak P1–P4, the first family of contours being a set of isotherms T1, T2, etc. and the second family being a set of isodose contours D1, D2, D3, D4. A consideration of FIG. 1 reveals the following: the absorbance and wavelength of the dosimeter's primary peak P1–P4 will identify the coordinates of a point in the absorbance-wavelength space of the figure. Furthermore, each such point P1–P4 has a unique isodose contour D1–D4 passing through it, namely, that for the dose which the dosimeter has received. Thus, the dose D1–D4 which such a PCDA based dosimeter has received may be determined by measuring the absorbance and wavelength of the spectrum's primary peak P1, P2, P3 or P4, etc.; it is not necessary to measure the sensor's temperature. In fact, should it be required, the sensor's temperature may be determined from the same absorbance-wavelength pair as well, a unique isotherm T1, T2, etc., passing through the point as well as the isodose line.

FIG. 1 illustrates that light absorption increases with dose. Closer examination of the sets of spectra S1–S4 show that the spectra move in a regular manner in absorbance-wavelength space as temperature is varied. To determine the dose a dosimeter has received, Respective of dosimeter temperature, any readily ascertainable point on the absorbance-wavelength curve or absorbance spectrum S1–S4 may be used. Readily discernible points are the primary peaks P1–P4, secondary peaks LP1–LP4 and a col CL1–CL4 between the primary and secondary peaks. The primary peak P1–P4 is of special interest because it offers the highest sensitivity to radiation dose.

Figure 2:
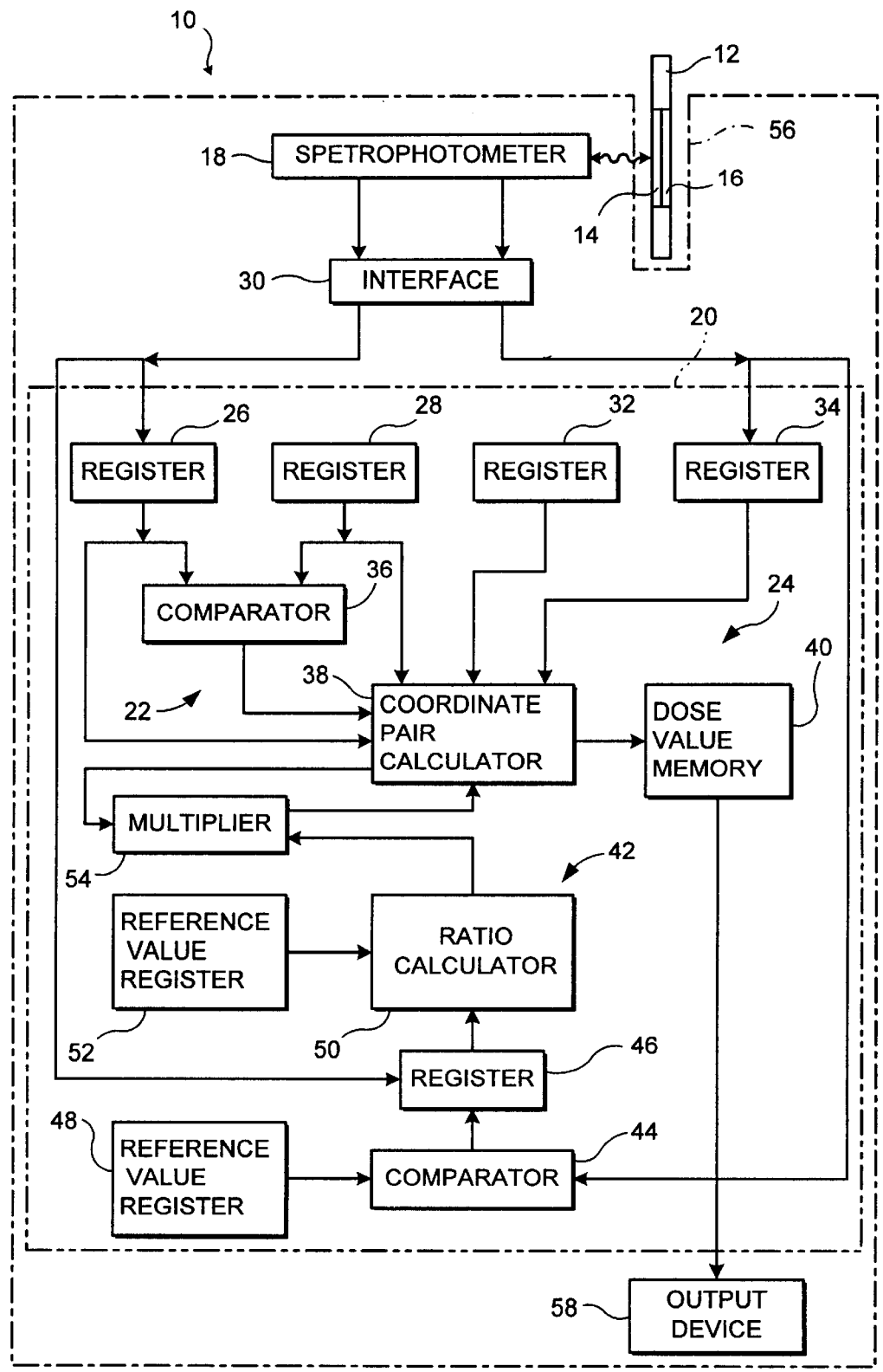
FIG. 2 is a schematic block diagram of an apparatus in accordance with the present invention for implementing a method for monitoring exposure to radiation, with compensation for temperature variation of a sensor.

FIG. 2 illustrates an apparatus 10 for determining the degree of exposure to radiation of an exposed radiation dosimeter 12 which includes a layer of radiation sensitive material 14 on a substrate 16, the radiation sensitive material having an optical absorbance which varies in accordance with degree of radiation exposure and wavelength and which also varies in dependence on temperature. Apparatus 10 comprises an optical sensor 18 such as a spectrophotometer for optically measuring a spectral absorbance of the exposed layer of radiation sensitive material 14 within a range of wavelengths, for example, a range of wavelengths in which the primary peak P1–P4 of the absorbance spectrum for the particular exposed dosimeter 12 can be expected to fall. Apparatus 10 further includes a specially programmed microprocessor 20. Microprocessor 20 comprises spectral analysis componentry 22 which is operatively connected to spectrophotometer 18 for examining the measured spectral absorbance of the exposed layer of radiation sensitive material 14 to determine an absorbance coordinate and a wavelength coordinate of a predetermined point, preferably a primary peak P1–P4, on a spectral absorbance curve S1–S4 of the exposed layer of radiation sensitive material 14. Spectral analysis componentry 22 is operatively connected to thickness compensating circuity 42 for adjusting the absorbance coordinate of a predetermined point.

Spectral analysis componentry 22 specifically includes a pair of cascaded registers 26 and 28. Register 26 is connected at an input to an interface unit 30 in turn connected at an input to spectrophotometer 18. Interface unit 30 converts signals from spectrophotometer 18 into a form utilizable by microprocessor 20. Register 26 receives a sequence of light absorbance values which correspond to wavelength values fed to a register 32. Register 32 is connected at an input to spectrophotometer 18 via interface 30 and at an output to another register 34.

Registers 26 and 28 feed their respective, successive, absorbance values to a comparator module 36 which transmits an output signal to a coordinate pair evaluator or calculator module 38 upon detecting a diminution in absorbance as wavelength is monotonically or gradually increased (or decreased). Coordinate pair evaluator or calculator module 38 is connected at additional inputs to registers 26, 28 and 32, 34 and to multiplier 54. Module 38 acts as part of spectral analysis componentry 22 to determine thickness corrected absorbance coordinate and a wavelength coordinate for the primary peak P1–P4. Module 38 first sequentially analyzes successive values of absorbance of the radiation sensitive material to determine the peak absorbance coordinate value and its corresponding wavelength coordinate value. Module 38 causes the peak absorbance value to be thickness corrected by transmitting the peak absorbance value to multiplier 54 which, in turn, returns the thickness corrected absorbance value. Module 38 then acts as part of correlating circuitry 24 and uses the calculated thickness corrected absorbance and wavelength coordinates of the primary peak P1–P4 to access a memory 40 to determine the radiation dose value D1–D4 which dosimeter layer 14 experienced in order to exhibit the particular absorbance spectrum S1–S4 and the associated primary peak P1–P4.

The peak absorbance and wavelength coordinates and dose levels stored in memory 40 are experimentally predetermined by the dosimeter manufacturer for each batch of dosimeters sharing a uniform absorbance coefficient and a common concentration of the radiation sensitive material 14 (e.g., PCDA). The experimental determination of the absorbance and wavelength coordinates and dose levels is simply executed by subjecting dosimeters of a batch to known radiation levels and measuring the absorbance spectra. It may be possible to encode the peak absorbance and wavelength coordinates and dose level data in a read-only memory which is shipped with a lot of dosimeters and which can be removably connected to apparatus 10 and particularly to microprocessor 20.

It is to be noted that PCDA dispersions conform to Beer's absorbance law which holds that absorbance varies linearly with path length (or dispersion thickness), absorbance coefficient and concentration. Hence, absorbance measured at one thickness may be corrected or normalized to some reference thickness by simply multiplying the measured absorbance by the ratio of the reference thickness to the actual thickness.

Just as the PCDA absorbance has been noted to vary with dispersion thickness, this same law may be used to measure thickness. The technique proposed herein is to include in the dispersion a radiation insensitive dye which has little absorbance in that portion of the spectrum where radiation sensitive PCDA develops absorbance as a result of exposure to radiation, but which does exhibit measurable absorbance in a region where radiation exposed PCDA has negligible absorbance. Two such regions exist, namely: wavelengths below about 440 nm down to perhaps 320 nm (where the commonly used polyester base of dispersion coated dosimeters begins to have significant absorbance); and wavelengths above about 720 nm. Such a radiation insensitive dye would not interfere with the dose measurement ability of the PCDA and would allow correction for variation in dispersion thickness of individual dosimeters. In general, the technique used would be as follows.

Each batch of PCDA based dispersion also includes a radiation insensitive dye having absorbance properties as described above. Coated material from the batch is characterized at a specific coating reference thickness, i.e., a specific reference absorbance for the dye. Dosimeters made from the batch may vary in coated dispersion thickness, thus requiring correction of measured PCDA absorbance. This is to be accomplished by measuring the absorbance of the dye in the dosimeter as well as the absorbance and wavelength of the PCDA primary peak. The absorbance of the PCDA peak is corrected for thickness variation by multiplying it by the ratio of the dye reference absorbance to the absorbance of the dye in the dosimeter.

In accordance with the above analysis, dosimeter layer 14 incorporates a substantially radiation impervious substance which absorbs electromagnetic energy outside of the optical absorbance spectrum of the exposed radiation sensitive material. Concomitantly, spectrophotometer 18 is operable to measure the absorbance of the radiation impervious material in the exposed dosimeter layer 14 at a pre-established wavelength. As illustrated in FIG. 2, microprocessor 20 includes a thickness compensating circuit 42 operatively connected to spectral analysis componentry 22 for adjusting the absorbance coordinate of a predetermined point in accordance with the measured value of the absorbance of the radiation impervious substance, to compensate for variation in a thickness of the layer of radiation sensitive material.

Compensating circuit 42 includes a comparator 44 operatively connected to spectrophotometer 18 via interface 30 for detecting when an absorbance value fed to a register 46 corresponds to the preestablished wavelength, the identity of which is stored in a register 48. Comparator 44 compares the wavelength value in register 48 with a wavelength value transmitted from spectrophotometer 18 and enables the feeding of the corresponding measured absorbance value to a ratio calculator module 50 via register 46. Module 50 computes the ratio of (1) a reference absorbance value corresponding to a standard thickness of dosimeter layer 14 to (2) the measured absorbance of the radiation impervious substance at the pre-established wavelength. The reference absorbance value is stored in a register 52. The ratio is then fed to a multiplier 54 that multiplies the peak absorbance value supplied by the coordinate pair calculator 38 by the ratio from ratio calculator 42 and returns the thickness corrected absorbance value to the coordinate pair calculator 38. The dose value memory 40 is then addressed by the coordinate pair calculator 38 using the thickness corrected absorbance and wavelength coordinate values. The dose corresponding to those coordinates is then read out from the dose value memory to output device 58 such as a display or a printer.

During the measurement of optical absorbances by spectrophotometer 18, dosimeter 12 is disposed in a slot 56 provided in a housing (not designated) of apparatus 10. A method utilizing apparatus 10 monitors exposure of dosimeter 12 to radiation, with compensation for temperature fluctuations of dosimeter 12 at the time of measurement and with compensation for variations in the thickness of radiation sensitive layer 14, from dosimeter to dosimeter of the same manufacturing batch. After exposure of dosimeter 12 and more particularly layer 14 to ionizing radiation (ultraviolet, X-ray, gamma, beta, etc.), spectrophotometer 18 is operated to optically measure a spectral absorbance of the exposed layer 14 within a range of wavelengths about the expected value of the primary peak. The measured spectral absorbance of the exposed layer 14 is examined by spectral analysis componentsy 22 to determine an absorbance coordinate and a wavelength coordinate of the primary peak P1–P4 on the spectral absorbance curve of the exposed layer of radiation sensitive material 14. Spectral analysis componentry 22 then transmits the absorbance coordinate to compensating circuit 42 which, in turn, returns the thickness corrected absorbance coordinate. The spectral analysis componently then addresses the dose value memory 40 of correlating circuit 24. Correlating circuit 24 then functions to determine a radiation dose value D1–D4 associated with the thickness corrected absorbance coordinate and the wavelength coordinate.

In accordance with the thickness compensation feature of the present invention, a method for monitoring exposure to radiation utilizes a radiation dosimeter including a layer of radiation sensitive material and a substantially radiation impervious substance on a substrate, the radiation sensitive material having an optical absorbance which varies in dependence on thickness of the layer of radiation sensitive material. The method comprises exposing the layer of radiation sensitive material to a dose of radiation, optically measuring an absorbance of the exposed layer of radiation sensitive material, measuring an absorbance of the radiation impervious substance in the exposed layer of radiation sensitive material, and adjusting the absorbance of the exposed layer of radiation sensitive material in accordance with the measured value of the absorbance of the radiation impervious substance, to compensate for variation in a thickness of the layer of radiation sensitive material and lastly, determining a radiation dose value from the thickness corrected absorbance coordinate value and the wavelength coordinate value.

It is understood that spectral analysis componentry 22, correlating circuitry 24 and thickness compensating circuit 42 are implemented by generic microprocessor circuits as modified by programming. The programming for those functional circuit components of microprocessor 20 are permanently stored in a microprocessor memory (not shown).

Although the invention has been described in terms of particular embodiments and applications, one of ordinary skill in the art, in light of this teaching, can generate additional embodiments and modifications without departing from the spirit of or exceeding the scope of the claimed invention. For example, a separate optical detector may be used to determine absorbance of the radiation impervious substance at the pre-established wavelength of absorbance. Accordingly, it is to be understood that the drawings and descriptions herein are proffered by way of example to facilitate comprehension of the invention and should not be construed to limit the scope thereof.

What is claimed is:

1. A method for monitoring exposure to radiation, with compensation for temperature variation of a sensor, comprising:

providing a radiation dosimeter including a layer of radiation sensitive material on a substrate, said radiation sensitive material having an optical absorbance which varies in accordance with degree of radiation exposure and wavelength and which also varies in dependence on temperature;

exposing said layer of radiation sensitive material to a dose of radiation;

after exposure of said layer of sensitive material to said dose of radiation, optically measuring a spectral absorbance of the exposed layer of radiation sensitive material within a range of wavelengths;

examining the measured spectral absorbance of said exposed layer of radiation sensitive material to determine an absorbance coordinate and a wavelength coordinate of a predetermined point on a spectral absorbance curve of said exposed layer of radiation sensitive material; and determining a radiation dose value associated with said absorbance coordinate and said wavelength coordinate.

2. The method defined in claim 1 wherein the measuring of the spectral absorbance of the exposed layer of radiation sensitive material includes the step of operating a spectrophotometer.

3. The method defined in claim 2 wherein the examining of the measured spectral absorbance of said exposed layer of radiation sensitive material is implemented automatically.

4. The method defined in claim 3 wherein said predetermined point is a local maximum of said spectral absorbance curve and wherein the examining of the measured spectral absorbance of said exposed layer of radiation sensitive material includes automatically comparing absorbance values corresponding to successive wavelengths in a monotonic sequence with one another to detect a rising and a subsequent falling in the absorbance values, defining said local maximum.

5. The method defined in claim 2 wherein said layer of radiation sensitive material includes a substantially radiation impervious substance having a local maximum absorbance value, further comprising:

operating said spectrophotometer to measure an absorbance of the radiation impervious substance in the exposed layer of radiation sensitive material; and adjusting the local maximum absorbance value in accordance with the measured value of the absorbance of the radiation impervious substance, to compensate for variation in a thickness of said layer of radiation sensitive material.

6. The method defined in claim 5 wherein the adjusting of the determined local maximum absorbance value includes multiplying the determined local maximum absorbance value by a ratio of a reference absorbance value and the measured value of the absorbance of the radiation impervious substance.

7. The method defined in claim 1 wherein the optical absorbance of said radiation sensitive material varies as a known function of radiation exposure and wavelength, said spectral absorbance curve being a contour or profile line of said function taken along a plane defined by said radiation dose.

8. The method defined in claim 1 wherein radiation of said dose of radiation has a wavelength shorter than wavelengths of the visible spectrum.

9. The method defined in claim 1 wherein the examining of the measured spectral absorbance of said exposed layer of radiation sensitive material is implemented automatically.

10. The method defined in claim 1 wherein said predetermined point is local maximum of said spectral absorbance curve and wherein the examining of the measured spectral absorbance of said exposed layer of radiation sensitive material includes comparing absorbance values corresponding to successive wavelengths with one another to detect a rising and falling in the absorbance values, corresponding to said local maximum.

11. The method defined in claim 1 wherein the examining of the measured spectral absorbance of said exposed layer of radiation sensitive material includes automatically comparing absorbance values corresponding to successive wavelengths with one another.

12. The method defined in claim 1 wherein said layer of radiation sensitive material includes a substantially radiation impervious substance having a determined local maximum absorbance value, further comprising:

optically measuring an absorbance of the radiation impervious substance in the exposed layer of radiation sensitive material; and adjusting the determined local maximum absorbance value in accordance with the measured value of the absorbance of the radiation impervious substance, to compensate for thickness of said layer of radiation sensitive material.

13. The method defined in claim 12 wherein the adjusting of the determined local maximum absorbance value includes multiplying the local maximum absorbance value by a ratio of a reference absorbance value and the measured value of the absorbance of the radiation impervious substance.

14. A method for monitoring exposure to radiation with compensation for variation in amount of detector material of a sensor, comprising:

providing a radiation dosimeter including a layer of radiation sensitive material on a substrate, said radiation sensitive material having an optical absorbance which varies in dependence on thickness of said layer of radiation sensitive material, said layer of radiation sensitive material including a substantially radiation impervious substance having a determined local maximum absorbance value;

exposing said layer of radiation sensitive material to a dose of radiation;

after exposure of said layer of sensitive material to said dose of radiation, optically measuring an absorbance of the exposed layer of radiation sensitive material;

measuring an absorbance of the radiation impervious substance in the exposed layer of radiation sensitive material;

adjusting the determined absorbance of the radiation sensitive material in accordance with the measured value of the absorbance of the radiation impervious substance, to compensate for variation in a thickness of said layer of radiation sensitive material; and determining a radiation dose value from the adjusted absorbance value and its wavelength value.

15. The method defined in claim 14 wherein the adjusting of a determined local maximum absorbance value includes multiplying the determined local maximum absorbance value by a ratio of a reference absorbance value and the measured value of the absorbance of the radiation impervious substance.

16. The method defined in claim 14 wherein the measuring of the absorbance of the radiation impervious substance includes the step of operating a spectrophotometer.

17. The method defined in claim 14 wherein the optical absorbance of said radiation sensitive material varies as a known function of radiation exposure and wavelength, said spectral absorbance curve being a contour or profile line of said function taken along a plane defined by said radiation dose, wherein optically measuring an absorbance of the exposed layer of radiation sensitive material includes optically measuring a spectral absorbance of the exposed layer of radiation sensitive material within a range of wavelengths, and wherein the determining of said radiation dose value includes:

examining the measured spectral absorbance of said exposed layer of radiation sensitive material to determine an absorbance coordinate and a wavelength coordinate of a predetermined point on a spectral absorbance curve of said exposed layer of radiation sensitive material; and determining a radiation dose value associated with said absorbance coordinate and said wavelength coordinate.

18. An apparatus for determining exposure to radiation of an exposed radiation dosimeter including a layer of radiation sensitive material on a substrate, said radiation sensitive material having an optical absorbance which varies in accordance with degree of radiation exposure and wavelength and which also varies in dependence on temperature, comprising:

optical sensing means for optically measuring a spectral absorbance of the exposed layer of radiation sensitive material within a range of wavelengths;

spectral analysis means operatively connected to said optical sensing means for examining the measured spectral absorbance of said exposed layer of radiation sensitive material to determine an absorbance coordinate and a wavelength coordinate of a predetermined point on a spectral absorbance curve of said exposed layer of radiation sensitive material; and correlating means operatively connected to said spectral analysis means for determining a radiation dose value associated with said absorbance coordinate and said wavelength coordinate.

19. The apparatus defined in claim 18 wherein said optical sensing means includes a spectrophotometer.

20. The apparatus defined in claim 19 wherein said predetermined point is a local maximum of said spectral absorbance curve and wherein said spectral analysis means includes means for automatically comparing absorbance values corresponding to successive wavelengths in a monotonic sequence with one another to detect a rising and a subsequent falling in the absorbance values, defining said local maximum.

21. The apparatus defined in claim 18 wherein said layer of radiation sensitive material includes a substantially radiation impervious substance, and further comprising:

means for measuring an absorbance of the radiation impervious substance in the exposed layer of radiation sensitive material; and thickness compensating means operatively connected to said correlating means for adjusting the determined absorbance value of a predetermined point in accordance with the measured value of the absorbance of the radiation impervious substance, to compensate for variation in a thickness of said layer of radiation sensitive material.

22. The apparatus defined in claim 21 wherein said thickness compensating means includes means for multiplying the determined absorbance value of a predetermined point by a ratio of a reference absorbance value and the measured value of the absorbance of the radiation impervious substance.

23. The apparatus defined in claim 18 wherein the optical absorbance of said radiation sensitive material varies as a known function of radiation exposure and wavelength, said spectral absorbance curve being a contour or profile line of said function taken along a plane defined by said radiation dose, radiation of said dose of radiation having a wavelength shorter than wavelengths of the visible spectrum.

24. An apparatus for monitoring exposure to radiation of an exposed radiation dosimeter including a layer of radiation sensitive material on a substrate, with compensation for variation in thickness of said layer of radiation sensitive material, comprising:

optical sensing means for optically measuring an absorbance of the radiation sensitive material in the exposed layer and for measuring an absorbance of the radiation impervious substance in the exposed layer;

thickness compensating means operatively connected to said analysis means for adjusting the determined absorbance value of the radiation sensitive material and obtain a thickness corrected absorbance of the radiation sensitive material in accordance with the measured value of the absorbance of the radiation impervious substance, to compensate for variation in a thickness of said layer of radiation sensitive material; and analysis means operatively connected to said optical sensing means for determining a radiation dose value from the thickness corrected absorbance of the radiation sensitive material in said layer.

25. The apparatus defined in claim 24 wherein said thickness compensating means includes means for multiplying the determined absorbance value of the radiation sensitive material by a ratio of a reference absorbance value and the measured value of the absorbance of the radiation impervious substance.

26. The apparatus defined in claim 24 wherein said optical sensing means includes a spectrophotometer.

27. The apparatus defined in claim 24 wherein the optical absorbance of said radiation sensitive material varies as a known function of radiation exposure and wavelength, said spectral absorbance curve being a contour or profile line of said function taken along a plane defined by said radiation dose, wherein said optical sensing means includes means for optically measuring a spectral absorbance of the exposed layer of radiation sensitive material within a range of wavelengths, and wherein said analysis means includes:

means for examining the measured spectral absorbance of said exposed layer of radiation sensitive material to determine an absorbance coordinate and a wavelength coordinate of a predetermined point on a spectral absorbance curve of said exposed layer of radiation sensitive material; and means for determining a radiation dose value associated with said absorbance coordinate and said wavelength coordinate.

* * * * *